United States Patent
Kim et al.

(10) Patent No.: US 10,764,976 B2
(45) Date of Patent: Sep. 1, 2020

(54) LIGHTING SYSTEMS, LIGHTING DEVICES AND LIGHTING CONTROL METHODS USING ULTRA-WIDEBAND SENSOR

(71) Applicant: Samsung Electronics Co., Ltd., Suwon-si, Gyeonggi-do (KR)

(72) Inventors: Chang Seob Kim, Seoul (KR); Chang Hoon Baek, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/055,950

(22) Filed: Aug. 6, 2018

(65) Prior Publication Data
US 2019/0191521 A1  Jun. 20, 2019

(30) Foreign Application Priority Data
Dec. 20, 2017  (KR) .................. 10-2017-0176556

(51) Int. Cl.
*H05B 33/08* (2020.01)
*H05B 37/02* (2006.01)
(Continued)

(52) U.S. Cl.
CPC .......... *H05B 45/10* (2020.01); *G01S 13/0209* (2013.01); *G01S 13/56* (2013.01); *H05B 47/105* (2020.01)

(58) Field of Classification Search
CPC ................. H05B 33/08; H05B 33/0842; H05B 33/0845; H05B 33/0854; H05B 37/02;
(Continued)

(56) References Cited

U.S. PATENT DOCUMENTS 6,372,608 B1  4/2002  Shimoda et al.
6,645,830 B2  11/2003  Shimoda et al.
(Continued)

FOREIGN PATENT DOCUMENTS

JP  2008-292491 A  12/2008
KR  10-1470054 B1  12/2014
(Continued)

OTHER PUBLICATIONS

Smart Sensor Module (SSM), 2017 LFI (Lightfair International) Innovation Award Category Winner for "Controls: Components, Sensors, Interfaces, and Software".

*Primary Examiner* — Thai Pham
(74) *Attorney, Agent, or Firm* — Harness, Dickey & Pierce, P.L.C.

(57) ABSTRACT

A lighting device includes an ultra-wideband (UWB) sensor module configured to detect movement, a light source module having a plurality of light emitting diodes (LEDs), and a driver configured to drive the plurality of LEDs, and a first controller connected to the light source module and the UWB sensor module, the first controller being configured to receive setting data from an external control device, output the setting data to the UWB sensor module to cause the UWB sensor module to set at least one operational parameter of the UWB sensor module, and output a control signal to the driver to cause the driver to drive the plurality of LEDs.

16 Claims, 15 Drawing Sheets

(51) Int. Cl.
*H05B 47/10* (2020.01)
*H05B 45/10* (2020.01)
*G01S 13/02* (2006.01)
*G01S 13/56* (2006.01)
*H05B 47/105* (2020.01)

(58) Field of Classification Search
CPC ............ H05B 37/0272; H05B 37/0227; H05B 45/10; H05B 47/10; H05B 47/105; H05B 47/115; H05B 47/19
See application file for complete search history.

(56) References Cited

U.S. PATENT DOCUMENTS

| | | |
|---|---|---|
| RE38,466 E | 3/2004 | Inoue et al. |
| 6,818,465 B2 | 11/2004 | Biwa et al. |
| 6,818,530 B2 | 11/2004 | Shimoda et al. |
| 6,858,081 B2 | 2/2005 | Biwa et al. |
| 6,967,353 B2 | 11/2005 | Suzuki et al. |
| 7,002,182 B2 | 2/2006 | Okuyama et al. |
| 7,084,420 B2 | 8/2006 | Kim et al. |
| 7,087,932 B2 | 8/2006 | Okuyama et al. |
| 7,154,124 B2 | 12/2006 | Han et al. |
| 7,208,725 B2 | 4/2007 | Sherrer et al. |
| 7,288,758 B2 | 10/2007 | Sherrer et al. |
| 7,319,044 B2 | 1/2008 | Han et al. |
| 7,501,656 B2 | 3/2009 | Han et al. |
| 7,709,857 B2 | 5/2010 | Kim et al. |
| 7,759,140 B2 | 7/2010 | Lee et al. |
| 7,781,727 B2 | 8/2010 | Sherrer et al. |
| 7,790,482 B2 | 9/2010 | Han et al. |
| 7,940,350 B2 | 5/2011 | Jeong |
| 7,959,312 B2 | 6/2011 | Yoo et al. |
| 7,964,881 B2 | 6/2011 | Choi et al. |
| 7,985,976 B2 | 7/2011 | Choi et al. |
| 7,994,525 B2 | 8/2011 | Lee et al. |
| 8,008,683 B2 | 8/2011 | Choi et al. |
| 8,013,352 B2 | 9/2011 | Lee et al. |
| 8,049,161 B2 | 11/2011 | Sherrer et al. |
| 8,129,711 B2 | 3/2012 | Kang et al. |
| 8,179,938 B2 | 5/2012 | Kim |
| 8,263,987 B2 | 9/2012 | Choi et al. |
| 8,324,646 B2 | 12/2012 | Lee et al. |
| 8,399,944 B2 | 3/2013 | Kwak et al. |
| 8,432,511 B2 | 4/2013 | Jeong |
| 8,459,832 B2 | 6/2013 | Kim |
| 8,502,242 B2 | 8/2013 | Kim |
| 8,536,604 B2 | 9/2013 | Kwak et al. |
| 8,735,931 B2 | 5/2014 | Han et al. |
| 8,766,295 B2 | 7/2014 | Kim |
| 9,674,916 B2 | 6/2017 | Hashimoto |
| 2004/0027270 A1 | 2/2004 | Fullerton et al. |
| 2008/0165046 A1 | 7/2008 | Fullerton et al. |
| 2008/0291024 A1 | 11/2008 | Zhang et al. |
| 2010/0141443 A1 | 6/2010 | Romero et al. |
| 2012/0306378 A1* | 12/2012 | Oh ............... H05B 37/0272 315/151 |
| 2013/0141011 A1* | 6/2013 | Fushimi ........... H05B 37/02 315/294 |
| 2014/0312802 A1* | 10/2014 | Recker ............ H05B 47/19 315/291 |
| 2015/0163744 A1* | 6/2015 | Suh ............... H04W 52/0235 370/311 |
| 2016/0258609 A1 | 9/2016 | Fujimoto et al. |
| 2018/0139815 A1 | 5/2018 | Cho et al. |
| 2018/0235057 A1* | 8/2018 | Choi ................ H05B 45/20 |

FOREIGN PATENT DOCUMENTS

| | | |
|---|---|---|
| KR | 10-1559391 B1 | 10/2015 |
| KR | 2016-0020088 A | 2/2016 |
| KR | 10-1723655 B1 | 4/2017 |
| KR | 10-2018-0092550 | 8/2018 |

* cited by examiner

LIGHTING SYSTEMS, LIGHTING DEVICES AND LIGHTING CONTROL METHODS USING ULTRA-WIDEBAND SENSOR

CROSS-REFERENCE TO RELATED APPLICATION

This application claims benefit of priority to Korean Patent Application No. 10-2017-0176556, filed on Dec. 20, 2017 in the Korean Intellectual Property Office, the disclosure of which is incorporated herein by reference in its entirety.

BACKGROUND

1. Field

Some example embodiments relate to lighting systems, lighting devices and lighting control methods, and more specifically, to lighting systems, lighting devices and lighting control methods using an ultra-wideband (UWB) sensor.

2. Description of Related Art

As lighting technology merges with information technology (IT), smart lighting technology capable of implementing various types of illumination according to external environments or to settings of users has been a focus of research. Smart lighting technology enables proper commands to be transmitted to lighting devices using wired/wireless communications technology or Internet of Things (IoT) technology, based on information obtained by various types of sensors provided in a specific region. Use of smart lighting technology may allow lighting devices to be effectively controlled, thus saving illumination costs.

SUMMARY

Some example embodiments provide lighting systems, lighting devices and lighting control methods using an ultra-wideband (UWB) sensor.

According to some example embodiments, a lighting device includes an ultra-wideband (UWB) sensor module configured to detect movement; a light source module having a plurality of light emitting diodes (LEDs), and a driver configured to drive the plurality of LEDs; and a first controller connected to the light source module and the UWB sensor module. The first controller is configured to receive setting data from an external control device, output the setting data to the UWB sensor module to cause the UWB sensor module to set at least one operational parameter of the UWB sensor module, and output a control signal to the driver to cause the driver to drive the plurality of LEDs.

According to some example embodiments, a lighting system includes a lighting device configured to detect movement using an UWB sensor, the detection being based on setting data, and drive a plurality of LEDs based on the detected movement; and a control device connected to the lighting device, the control device being configured to provide the setting data to the lighting device.

According to some example embodiments, a lighting control method includes receiving setting data. The lighting control method further includes setting operating parameters of an UWB sensor based on the received setting data; detecting movement using the UWB sensor, the detecting being based on the set operating parameters. Furthermore, the lighting control method includes driving a plurality of LEDs according to a result of the detecting.

BRIEF DESCRIPTION OF DRAWINGS

The above, and other aspects, features, and advantages of the present disclosure will be more clearly understood from the following detailed description when taken in conjunction with the accompanying drawings, in which.

DETAILED DESCRIPTION

Lighting devices, lighting systems, and lighting control methods to be described below may have a variety of configurations and some example embodiments are not limited to the specific configurations described herein.

Figure 1:
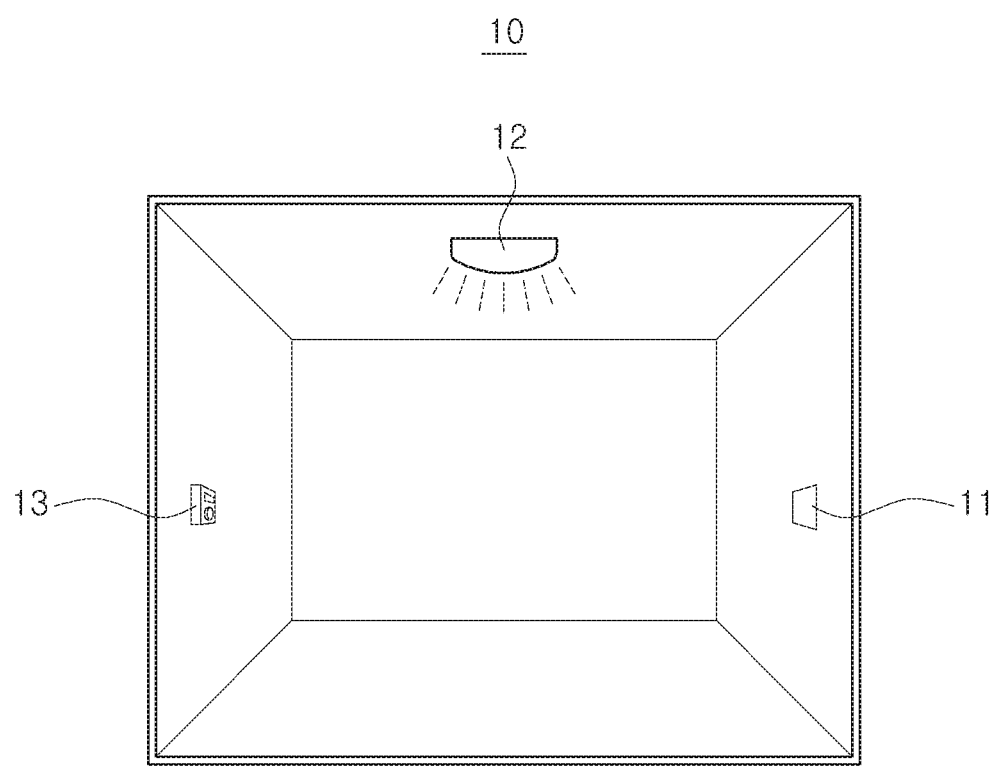
FIG. 1 is a schematic view of an interior space including a lighting device, according to some example embodiments, may be provided.

FIG. 1 is a schematic view of an interior space including a lighting device, according to some example embodiments. A lighting device 10, according to some example embodiments, may be provided in an interior space. However, in some example embodiments, the lighting device 10 may also be provided in an exterior space. The lighting device 10 may include an ultra-wideband (UWB) sensor module 11, a light source module 12, and a controller 13.

The UWB sensor module 11 may include at least one UWB sensor. The UWB sensor may transmit a signal at high speed using a very short pulse. UWB technology may be applied to communications or radars, using a wide frequency band of several GHz or more in the baseband without using radio frequency (RF) carriers, and may use very low spectrum power density. The UWB sensor may obtain data regarding whether an object is present, movements of the object, and a distance to the object by transmitting a pulse signal at constant time periods, receiving a signal reflected from the object, and processing the received signal.

In some example embodiments, as illustrated in FIG. 1, the UWB sensor module 11 may be provided independently of the light source module 12 and the controller 13. In some example embodiments, the UWB sensor module 11 may be integrally provided with the light source module 12 and/or the controller 13 (as discussed herein, being "integrally provided" includes being provided within a common housing). Due to high transmittivity of a signal from the UWB sensor, the UWB sensor may not be exposed to a space to be detected, and may be provided externally of a wall of a building or of a space to be detected. For example, the UWB sensor module 11 may be provided inside a reflector or a diffuser of a lighting device, integrally with the light source module 12. In some example embodiments, the UWB sensor module 11 may be disposed around a door or a window of the interior space on which the lighting device 10 may be provided, to detect movements. When a movement is detected externally, the UWB sensor module 11 may flicker a light source to inform the user of the detected movement.

The light source module 12 may include light emitting devices such as a plurality of light emitting diode (LED) devices. The LED devices may be used for illumination, and may be white light emitting devices. According to some example embodiments, the lighting device 10 may be a bulb- or bar-type lamp. The bulb-type lamp will be detailed with reference to FIG. 13, and the bar-type lamp will be detailed with reference to FIG. 14.

The controller 13 may be provided as an integrated circuit (IC) chip or the like, and the controller 13 may interface with the user via a control panel that includes a switch for turning on or off the light source module 12 or a dimming dial for adjusting the brightness of the light source module 12. In some example embodiments, as illustrated in FIG. 1, the controller 13 may be provided independently of the light source module 12. In some example embodiments, the controller 13 may be integrally provided with the light source module 12. Here, the user may interface with the controller 13 using a remote control or a wireless dimmer.

The controller 13 may be connected to the UWB sensor module 11 and the light source module 12 to communicate therewith, and may control operations of the UWB sensor module 11 and the light source module 12. The controller 13 may transmit data to the UWB sensor module 11 and receive information obtained by the UWB sensor module 11 through a communications interface. The user may input data through the controller 13 in order to set operations of the UWB sensor module 11, and the controller 13 may transmit data to the UWB sensor module 11 based on the input data, such that operating parameters of the UWB sensor module 11 may be adjusted or set. The controller 13 may receive information obtained by the UWB sensor module 11, store the received information, and manage the information in a database. The controller 13 may output a control signal to control the light source module 12 based on the stored information. Alternatively, the controller 13 may transmit the stored information to an external reception device to use the information obtained by the UWB sensor module 11 for other purposes.

Figure 2:
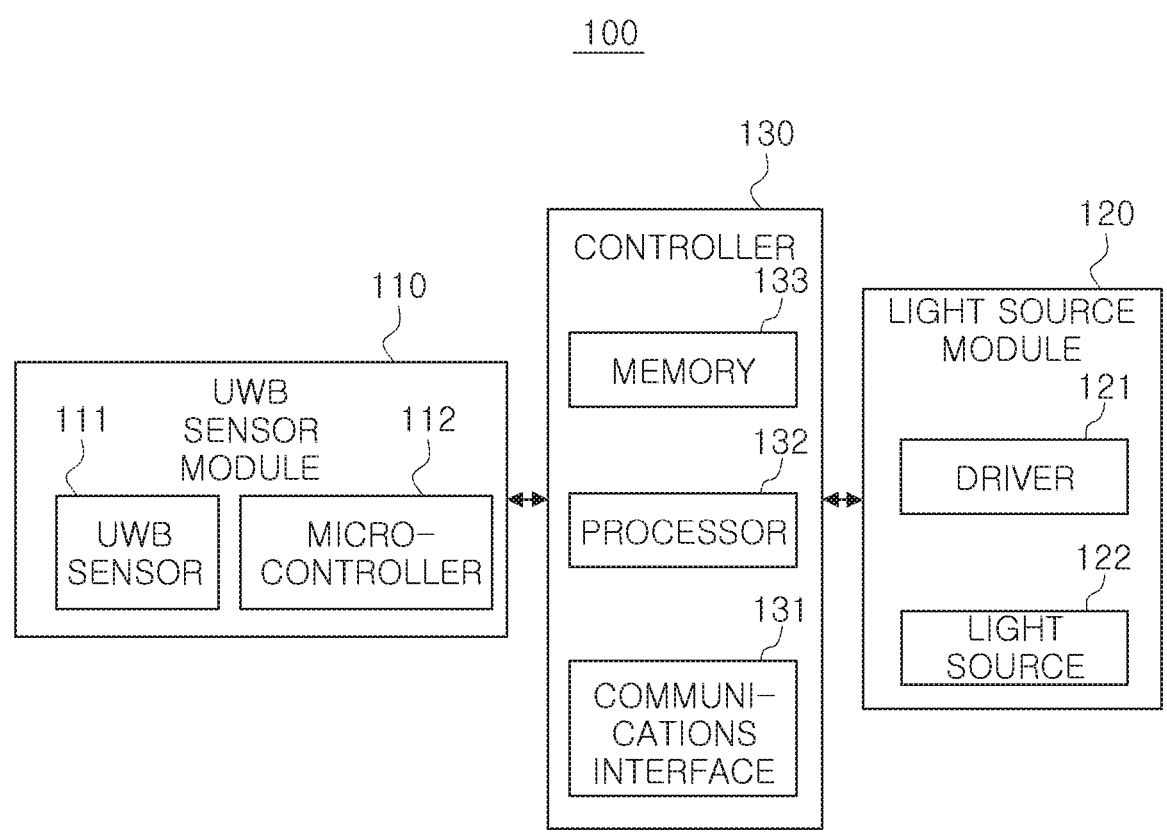
FIG. 2 is a block diagram illustrating a lighting device, according to some example embodiments.

FIG. 2 is a block diagram illustrating a lighting device, according to some example embodiments. A lighting device 100, according to some example embodiments, may include an UWB sensor module 110 including an UWB sensor 111, a light source module 120 configured to emit light, and a controller 130. According to some example embodiments, the lighting device 100, the UWB sensor module 110, the light source module 120 and the controller 130 of FIG. 2 are similar to or the same as the lighting device 10, the UWB sensor module 11, the light source module 12 and the controller 13 of FIG. 1. Redundant descriptions between FIGS. 1 and 2 may be omitted below.

The UWB sensor module 110 may include at least one UWB sensor 111 and a microcontroller 112. The microcontroller 112 may control operations of the UWB sensor 111, and may process a signal obtained by the UWB sensor 111. The UWB sensor 111 may transmit a short pulse signal at constant time periods and receive a signal reflected from an object. The microcontroller 112 may generate sensing information regarding whether an object is present, movements of the object, and a distance to the object by processing the signal received from the UWB sensor 111.

The controller 130 may transmit data to the UWB sensor module 110 to adjust or set operating parameters of the UWB sensor module 110 such that the microcontroller 112 may generate the sensing information. The operating parameters may include a sensitivity with which the UWB sensor module 110 may detect the object. In some example embodiments, the sensitivity of the UWB sensor module 110 may be determined by a degree of the movements of the object. For example, when the lighting device is provided in a conference room, the sensitivity may be set to maintain illumination. The operating parameters may include a distance or area in which the UWB sensor module 110 may detect the object. In some example embodiments, the UWB sensor module 110 may be configured to receive the detectable distance or area, after a certain period of time, when receiving a pulse signal reflected from the object. For example, when the user does not want to detect pets moving on the floor indoors, the user may set, as a detectable distance or area, a distance or area from the indoor floor to a certain height.

The light source module 120 may include a light source 122 including a light emitting device such as a plurality of LEDs, and a driver 121 configured to supply a driving voltage or current to the LEDs. The LEDs may be arranged in the form of an array, and may be mounted on a circuit board or the like. The circuit board may have the driver 121 provided thereon to supply driving power to the LEDs. The driver 121 may include a rectifier circuit configured to convert alternating current (AC) to direct current (DC), and a DC-DC converter circuit configured to increase or decrease the output of the rectifier circuit to supply driving power to the light source 122. Examples of the DC-DC converter circuit may include a buck converter and a boost converter. A configuration of a circuit included in the driver may be implemented according to various topologies.

The controller 130 may be provided in the form of an IC chip, and may control operations of the driver 121. In some example embodiments, when the driver 121 includes a DC-DC converter circuit for generating driving power, the controller 130 may control a duty ratio and an operating frequency of a switching device included in the DC-DC converter circuit to control the brightness of the light source 122.

The controller 130 may be connected to the UWB sensor module 110 and the light source module 120 to communicate therewith through various types of communications interfaces. The controller 130 may include a communications interface 131 configured to communicate with the UWB sensor module 110 and the light source module 120, a memory 133 configured to store information collected from the UWB sensor module 110, and at least one processor 132 configured to control operations of the communications interface 131 and the memory 133. According to some example embodiments, the UWB sensor module 110 and the light source module 120 may include communications interfaces similar to or the same as the communications interface 131.

The communications interface 131 may include a wired communications interface or/and a wireless communications interface. The controller 130 may be connected to the UWB sensor module 110 through the communications interface 131, and may transmit, to the UWB sensor module 110, data for setting operating parameters of the UWB sensor module 110 (also referred to herein as "setting data"). In some example embodiments, the controller 130 may transmit, to the UWB sensor module 110, data for setting the sensitivity with which the UWB sensor module 110 may detect an object. Further, the controller 130 may transmit, to the UWB sensor module 110, data for setting a detectable distance or area of the UWB sensor module 110.

The processor 132 may store information obtained by the UWB sensor module 110 in the memory 133 at regular intervals. In some example embodiments, the processor 132 may store the pieces of information in the memory 133 at regular intervals, and according to an administrator's request, may retrieve the pieces of information from the memory 133 and transmit the retrieved information to an external administrator server. Further, the processor 132 may transmit the pieces of information stored in the memory 133 to the external administrator server at an automatically determined time. According to some example embodiments, operations characterized herein as being performed by the controller 130 may be performed by the processor 132 by executing instructions stored in a non-transitory computer-readable medium (e.g., memory 133) that correspond to the operations.

Figure 3:
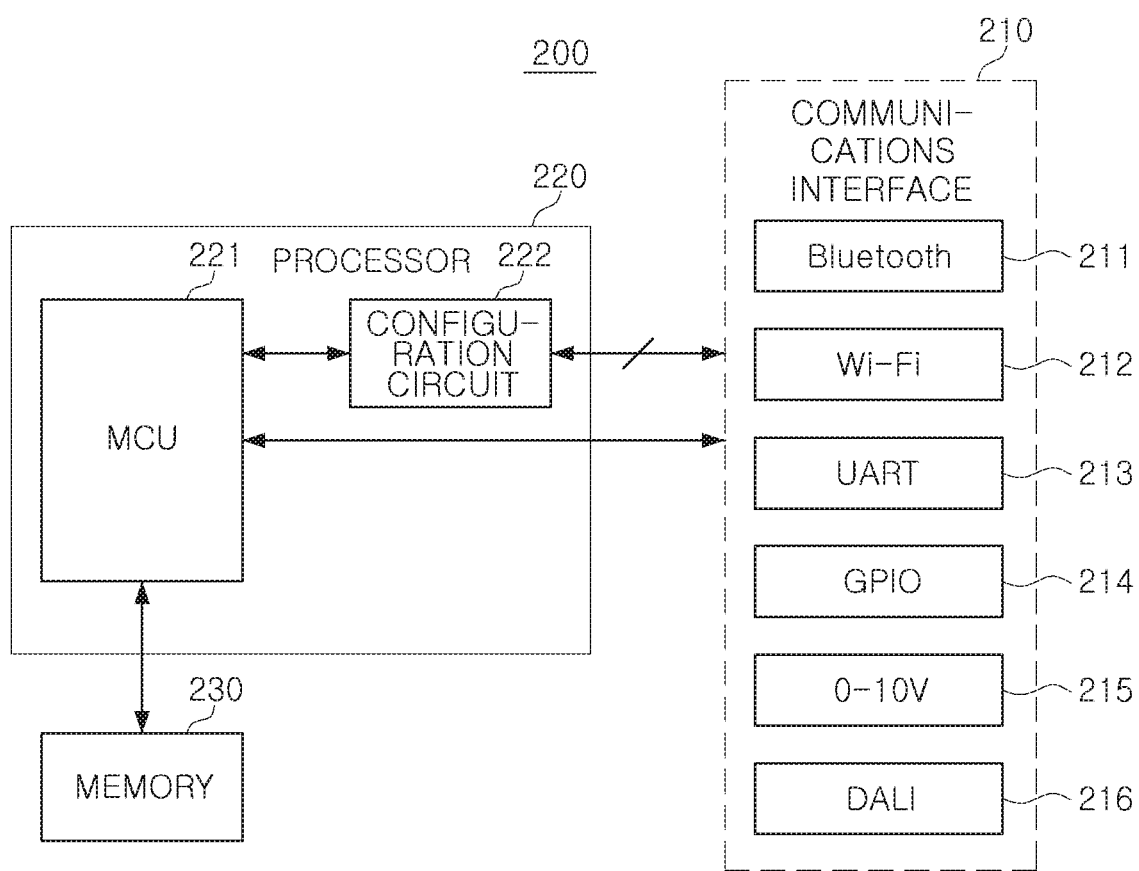
FIG. 3 is a block diagram illustrating a controller controlling a lighting device, according to some example embodiments.

FIG. 3 is a block diagram illustrating a controller configured to control a lighting device, according to some example embodiments. A controller 200, according to some example embodiments, may include a communications interface 210, a memory 230 configured to store data, and a processor 220 configured to control operations of the communications interface 210 and the memory 230. According to some example embodiments, the controller 200 of FIG. 3 is similar to or the same as the controller 130 of FIG. 2. Redundant descriptions between FIGS. 3 and 2 may be omitted below.

The communications interface 210 may include a wired communications interface or/and a wireless communications interface. In some example embodiments, the wired communications interface and the wireless communications interface may be provided as separate communications modules. The wireless communications interface may include a Bluetooth® interface 211, a Bluetooth® Low Energy interface, a Wi-Fi interface 212, and a Zigbee® interface. The wired communications interface may include various types of communications interfaces such as a Universal Asynchronous Receiver/Transmitter (UART) interface 213, a General-Purpose Input/Output (GPIO) interface 214, a 0-10 V interface 215, and a Digital Addressable Lighting Interface (DALI) 216. The communications interface 210 may further include other communications interfaces, for example, Universal Serial Bus (USB), RS-485, Serial Peripheral Interface (SPI), and Inter-Integrated Circuit (I2C).

The communications interface 210 may connect the controller 200 to an UWB sensor module (e.g., UWB sensor module 110) and a light source module (e.g., light source module 120) to enable communications therebetween. For example, the controller 200 may be connected to the UWB sensor module through the UART interface 213 or the GPIO interface 214. The controller 200 may be connected to the light source module through the 0-10 V interface 215 or the DALI interface 216.

The processor 220 may include a microcontroller unit (MCU) 221 and a configuration circuit 222. The MCU 221 may store a variety of information transmitted through the communications interface 210 in the memory 230, may manage the information stored in the memory 230, and may control operations of the configuration circuit 222.

The configuration circuit 222 may communicate with a driver of the light source module (e.g., the driver 121 of the light source module 120), and may store an operating mode of the driver of the light source module, and an output voltage value or an output current value according to the operating mode of the driver of the light source module. The configuration circuit 222 may be provided to set a voltage and a current output by the driver of the light source module, and may be implemented as an IC or the like having a read only memory (ROM).

The MCU 221 may collect information obtained by the UWB sensor module through one or more of the various communications interfaces 211 to 216 of the communications interface 210, and may store the collected information in the memory 230. For example, the MCU 221 may collect pieces of information obtained by the UWB sensor module, and may store the collected pieces of information in the memory 230. Further, when the MCU 221 detects a determined event, for example, movements of an object, the MCU 221 may store pieces of information obtained by sensors in the memory 230, regardless of passage of the regular intervals. The pieces of information stored in the memory 230 may be saved in a database to be managed, and may be used to maintain and repair the lighting system. According to some example embodiments, operations characterized herein as being performed by the controller 200 may be performed by the MCU 221 by executing instructions stored in a non-transitory computer-readable medium (e.g., memory 230) that correspond to the operations. The term 'microcontroller unit,' as used in the present disclosure, may refer to, for example, a hardware-implemented data processing device having circuitry that is physically structured to execute desired operations including, for example, operations represented as code and/or instructions included in a program. In some example embodiments the above-referenced hardware-implemented data processing device may include, but is not limited to, a controller, a microprocessor, a central processing unit (CPU), a processor core, a multi-core processor; a multiprocessor, an application-specific integrated circuit (ASIC), and a field programmable gate array (FPGA).

Figure 4:
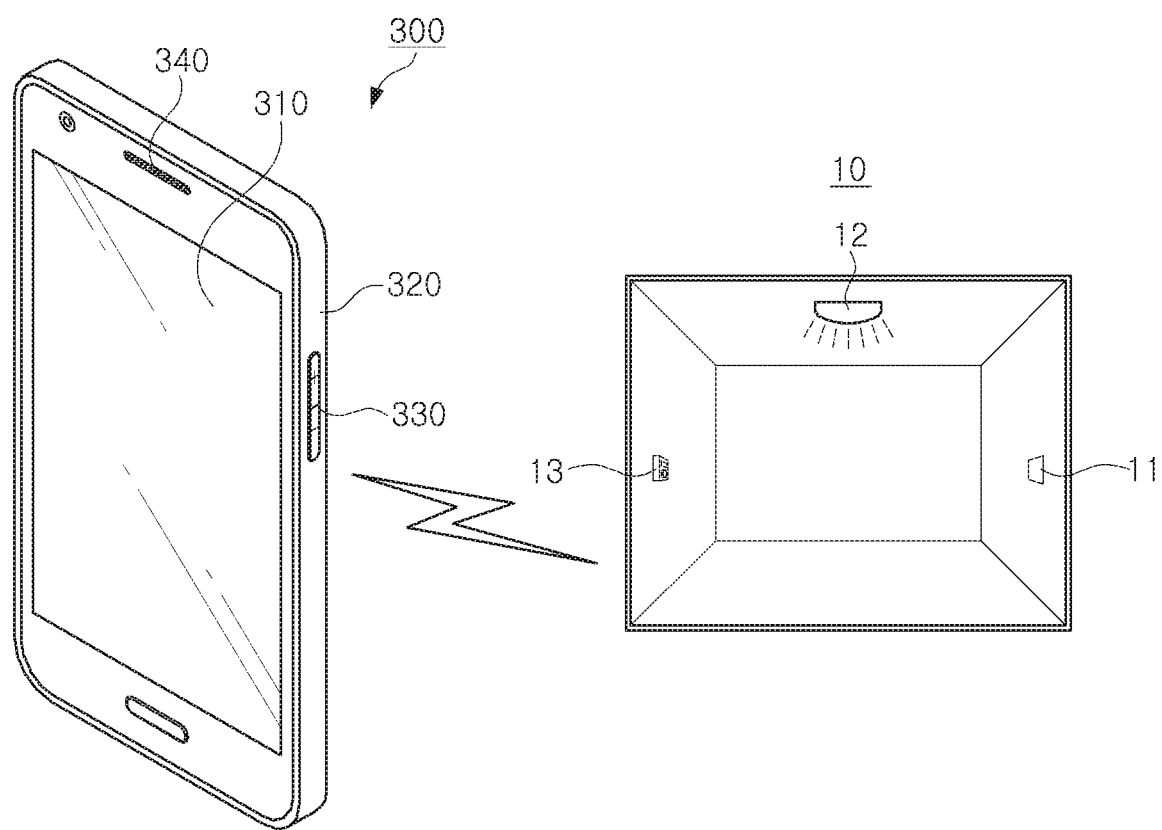
FIG. 4 is a schematic view illustrating a lighting system, according to some example embodiments.

FIG. 4 is a schematic view illustrating a lighting system, according to some example embodiments. The lighting system, according to some example embodiments, may include a lighting device 10 and a smartphone 300. The smartphone 300 may be connected to the lighting device 10 through a wireless communications interface to communicate therewith.

The lighting device 10 may include an UWB sensor module 11, a light source module 12, and a controller 13, as described above with reference to FIG. 1. The controller 13 included in the lighting device 10 may have a communications interface. The communications interface of the controller 13 may include a wireless communications interface. The controller 13 may be connected to the smartphone 300 through the wireless communications interface to communicate therewith.

The smartphone 300 may include a display device 310, a housing 320, and a key input unit 330. Various types of applications may be installed and executed on the smartphone 300, and the applications executed on the smartphone 300 may include an application that may generate setting data for controlling operations of the lighting device 10. The smartphone 300 may transmit the data for setting the operations of the lighting device 10 to the lighting device 10. In some example embodiments, when the lighting device 10 is first provided in a specific space, the smartphone 300 may transmit, to the lighting device 10, data for setting operating parameters of the UWB sensor module 11 suitable for the conditions of the space. In some example embodiments, the smartphone 300 may transmit data for setting the sensitivity of the UWB sensor module 11, and may transmit data for setting a detectable distance or area of the UWB sensor module 11. Further, the smartphone 300 may transmit data for setting a lighting time and a flashing time of the light source module 12.

Figure 5:
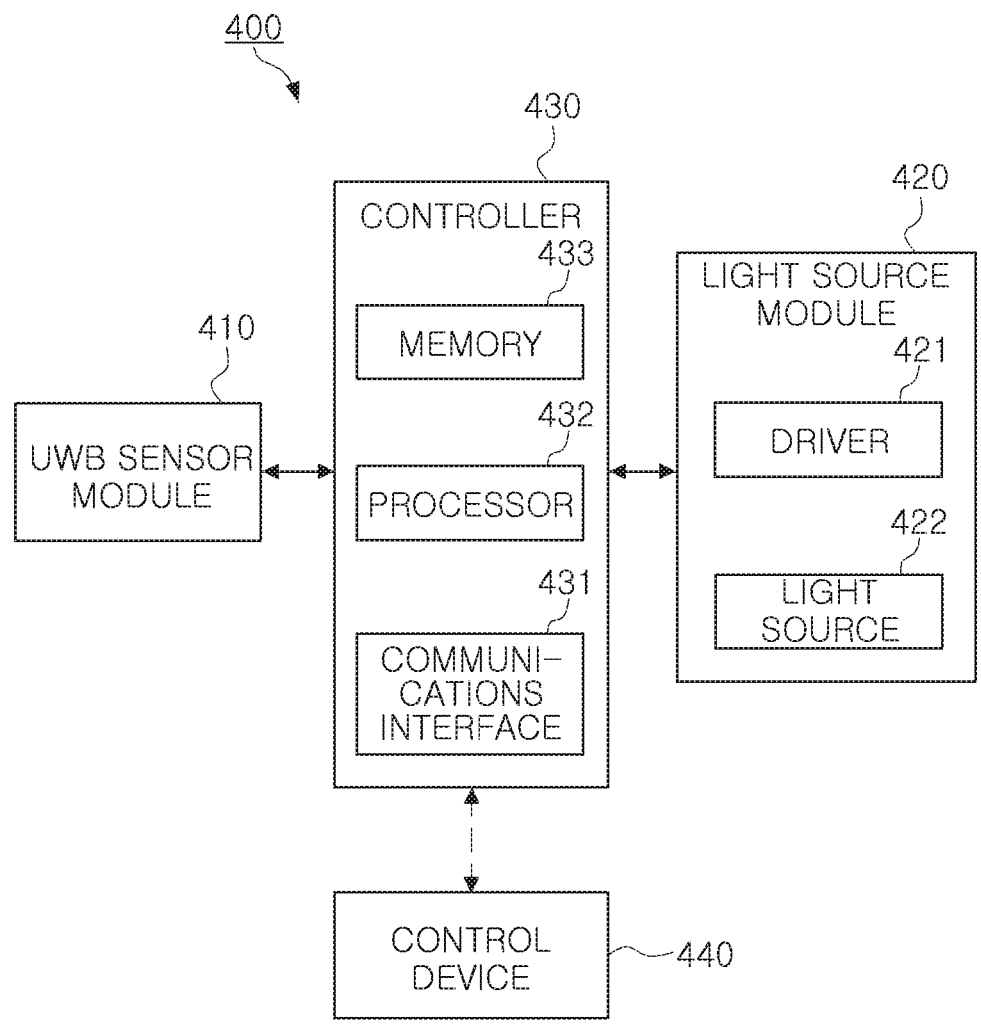
FIG. 5 is a block diagram illustrating a lighting system, according to some example embodiments.

FIG. 5 is a block diagram illustrating a lighting system, according to some example embodiments. A lighting system 400, according to some example embodiments, may include an UWB sensor module 410, a light source module 420, a controller 430, and an external control device 440. The light source module 420 may include a driver 421 and a light source 422, and the controller 430 may include a communications interface 431, a processor 432, and a memory 433. The UWB sensor module 410, the light source module 420, and the controller 430 may be fundamentally the same as or similar to the UWB sensor module 110, the light source module 120, and the controller 130 illustrated in FIG. 2. Thus, detailed descriptions thereof will be omitted, and details regarding a connection between the controller 430 and the external control device 440 will mainly be described.

The controller 430 may include the communications interface 431 for communicating with the external control device 440. The communications interface 431 may include various wired and/or wireless communications interfaces, and in some example embodiments, the communications interface 431 may include various wireless communications interfaces such as Wi-Fi, wireless local area network (WLAN), radio frequency identification (RFID), near field communication (NFC), infrared communications, and Bluetooth® interfaces. The controller 430 may be connected to the external control device 440 through one or more of the wireless communications interfaces to communicate therewith. In some example embodiments, the controller 430 may be connected to the external control device 440 through one of more of the wired communications interfaces to communicate therewith.

The external control device 440 may be a separate remote controller provided together with the lighting system 400, or may be implemented using one of various smart devices such as smartphones, personal digital assistants (PDAs), tablet personal computers (PCs), and laptop PCs. The external control device 440 may transmit data for setting operations of the UWB sensor module 410. For example, when a lighting device is first provided in a specific space, the external control device 440 may transmit, to the controller 430, data for setting operating parameters of the UWB sensor module 410 suitable for the conditions of the space. In some example embodiments, the external control device 440 may transmit data for setting the sensitivity of the UWB sensor module 410, and may transmit data for setting a detectable distance of the UWB sensor module 410. Further, the external control device 440 may also receive information obtained by the UWB sensor module 410 through the controller 430. Connection between the lighting system 400 and the external control device 440 will be described in detail, with reference to FIG. 16.

Figure 6:
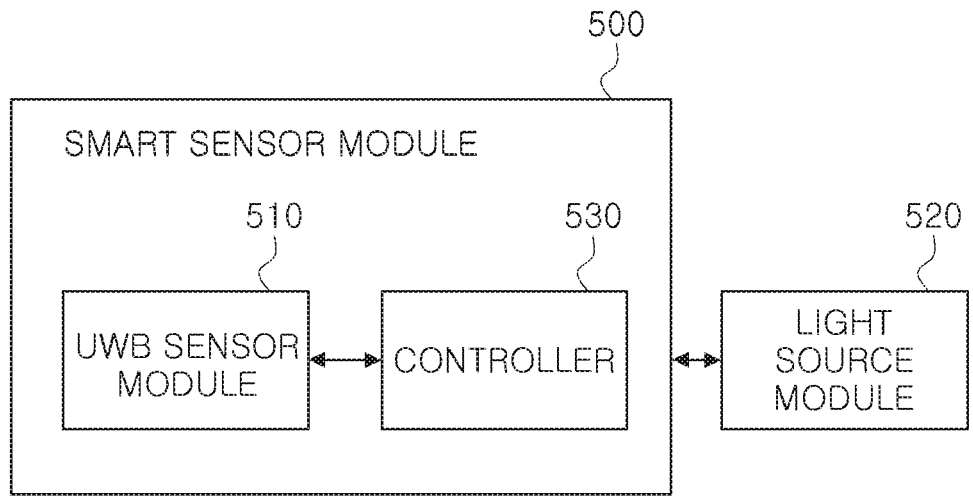
FIG. 6 is a block diagram illustrating a lighting device including a smart sensor module, according to some example embodiments.

FIG. 6 is a block diagram illustrating a lighting device including a smart sensor module, according to some example embodiments. A lighting device, according to some example embodiments, may include a smart sensor module 500 and a light source module 520. The smart sensor module 500 may include an UWB sensor module 510 and a controller 530, and may be integrally provided. The smart sensor module 500 may be connected to the light source module 520 to output a control signal for controlling the light source module 520. The UWB sensor module 510, the light source module 520, and the controller 530 may be fundamentally the same as or similar to the UWB sensor modules 11, 110, and 410, the light source modules 12, 120, and 420, and the controller 13, 130, and 430 described above with reference to FIGS. 1 through 5. Thus, detailed descriptions thereof will be omitted.

Figure 7:
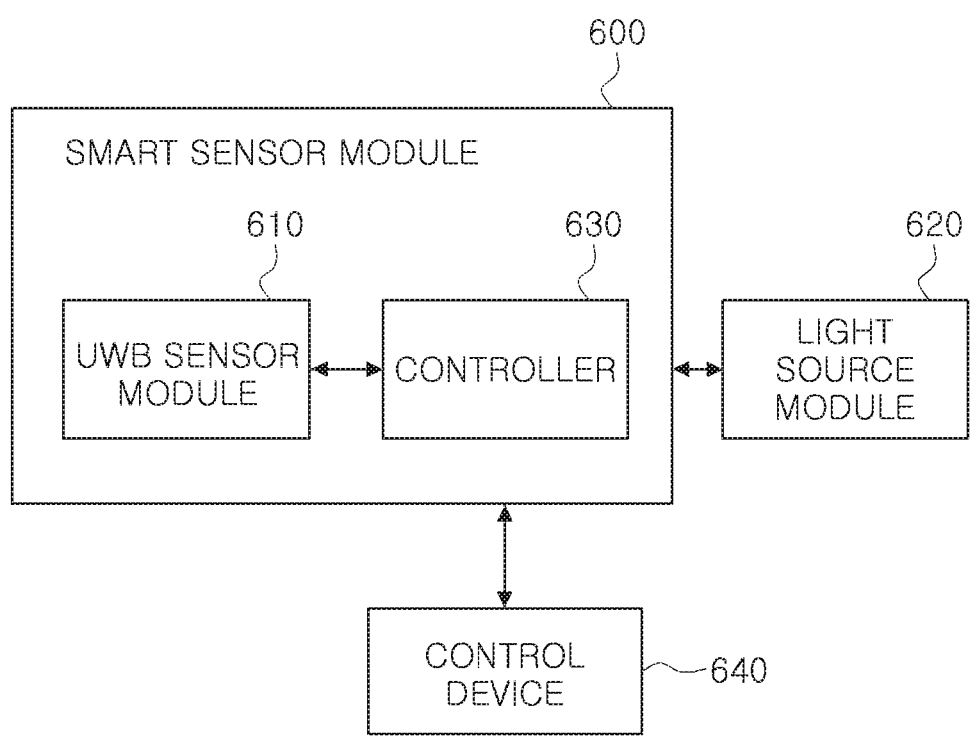
FIGS. 7 and 8 are block diagrams illustrating lighting systems including smart sensor modules, according to some example embodiments.

FIG. 7 is a block diagram illustrating a lighting system including a smart sensor module, according to some example embodiments. The lighting system, according to some example embodiments, may include a smart sensor module 600, a light source module 620, and an external control device 640. According to some example embodiments, the smart sensor module 600 and the light source module 620 of FIG. 7 are similar to or the same as the smart sensor module 500 and the light source module 520 of FIG. 6. According to some example embodiments, the external control device 640 of FIG. 7 is similar to or the same as the external control device 440 of FIG. 5. Redundant descriptions between FIGS. 5-7 may be omitted below. The smart sensor module 600 may include an UWB sensor module 610 and a controller 630, and may be integrally provided. The smart sensor module 600 may be connected to the light source module 620 to output a control signal for controlling the light source module 620. The smart sensor module 600 may be connected to the external control device 640 through a communications interface. The user may set operations of the smart sensor module 600 using the external control device 640. For example, the user may set the sensitivity of the UWB sensor module 610 and/or set a detectable distance or area of the UWB sensor module 610. In some example embodiments, the user may set a lighting or flashing time of the light source module 620 using the external control device 640.

Figure 8:
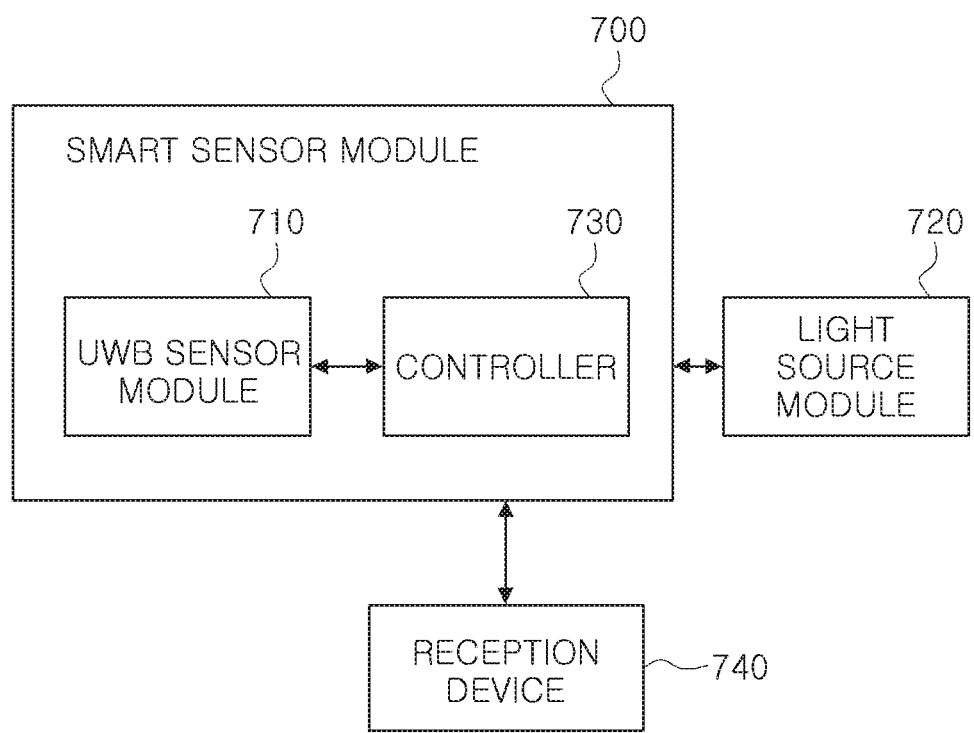

FIG. 8 is a block diagram illustrating a lighting system including a smart sensor module, according to some example embodiments. The lighting system, according to some example embodiments, may include a smart sensor module 700, a light source module 720, and an external reception device 740. According to some example embodiments, the smart sensor module 700 and the light source module 720 of FIG. 8 are similar to or the same as the smart sensor module 500 and the light source module 520 of FIG. 6. Redundant descriptions between FIGS. 6 and 8 may be omitted below. The smart sensor module 700 may include an UWB sensor module 710 and a controller 730, and may be integrally provided. The smart sensor module 700 may be connected to the light source module 720 to output a control signal for controlling the light source module 720. The smart sensor module 700 may be connected to the external reception device 740 through a communications interface. The smart sensor module 700 may transmit, to the external reception device 740, information obtained by the UWB sensor module 710. The external reception device 740 may include a mobile application, a bridge, a gateway, and an access point. The external reception device 740 may collect and analyze data transmitted from a plurality of smart sensor modules and use the analyzed data for various purposes. For example, the external reception device 740 may generate a floor map showing the density of an object detected in a building, using the transmitted data, and may control illumination of the building, based on the generated floor map.

Figure 9:
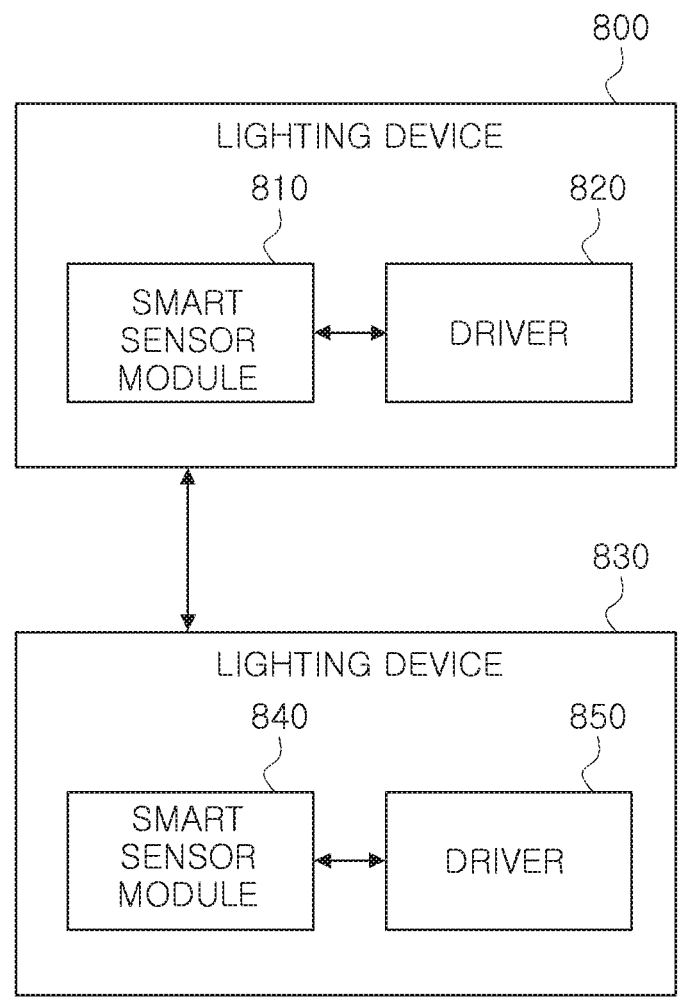
FIG. 9 is a block diagram illustrating communications between lighting devices including smart sensor modules, according to some example embodiments.

FIG. 9 is a block diagram illustrating communications between lighting devices including smart sensor modules, according to some example embodiments. A first lighting device 800, according to some example embodiments, may include a smart sensor module 810 and a driver 820, and may be integrally provided. A second lighting device 830 may likewise include a smart sensor module 840 and a driver 850, and may be integrally provided. The first lighting device 800 and the second lighting device 830 may communicate with each other through communications interfaces included in the respective smart sensor modules 810 and 840. The communications interfaces included in the smart sensor modules 810 and 840 may be wired communications interfaces or wireless communications interfaces. In some example embodiments, the smart sensor modules 810 and 840 may include both a wired communications interface and a wireless communications interface.

Figure 10:
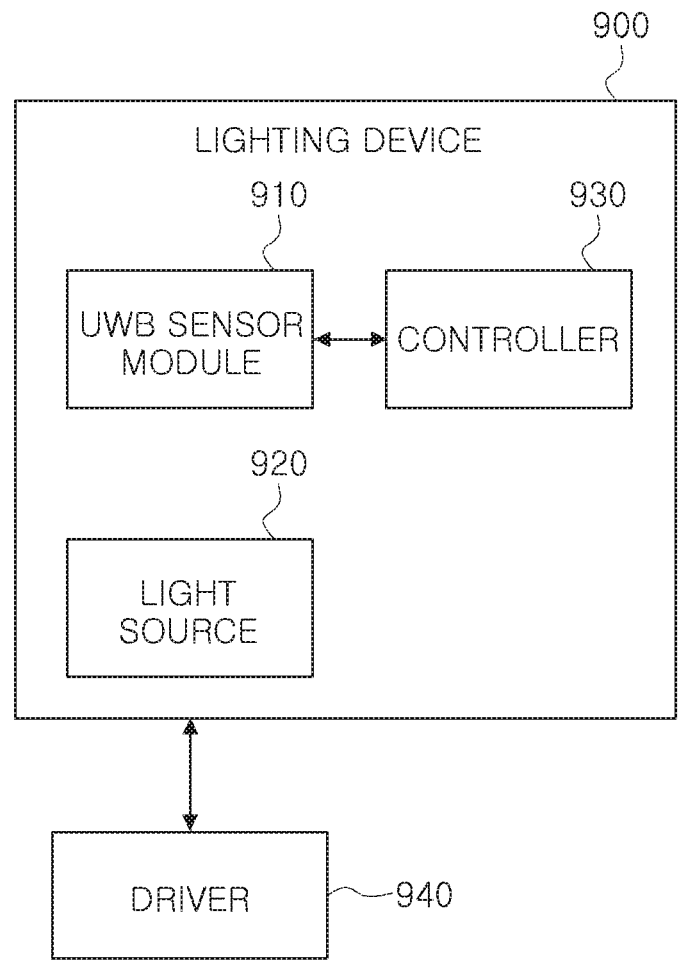
FIGS. 10 and 11 are block diagrams illustrating lighting devices including ultra-wideband (UWB) sensors, according to some example embodiments.

FIG. 10 is a block diagram illustrating a lighting device including an UWB sensor, according to some example embodiments. A lighting device 900, according to some example embodiments, may include an UWB sensor module 910, a light source 920, and a controller 930, and may be integrally provided. The lighting device 900 may be externally connected to a driver 940, supply a control signal for controlling the light source 920 to the driver 940, and receive a voltage or a current for driving the light source 920 from the driver 940. According to some example embodiments, the controller 930 supplies the control signal to the driver 940 and the driver 940 provides the voltage or current to the light source 920 to drive the light source 920. The UWB sensor module 910, the light source 920, the controller 930, and the driver 940 may be fundamentally the same as or similar to the UWB sensor modules 11, 110, and 410, the light source modules 12, 120, and 420, the controller 13, 130, and 430, and the drivers 121 and 421 described above with reference to FIGS. 1 through 5. Thus, detailed descriptions thereof will be omitted.

Figure 11:
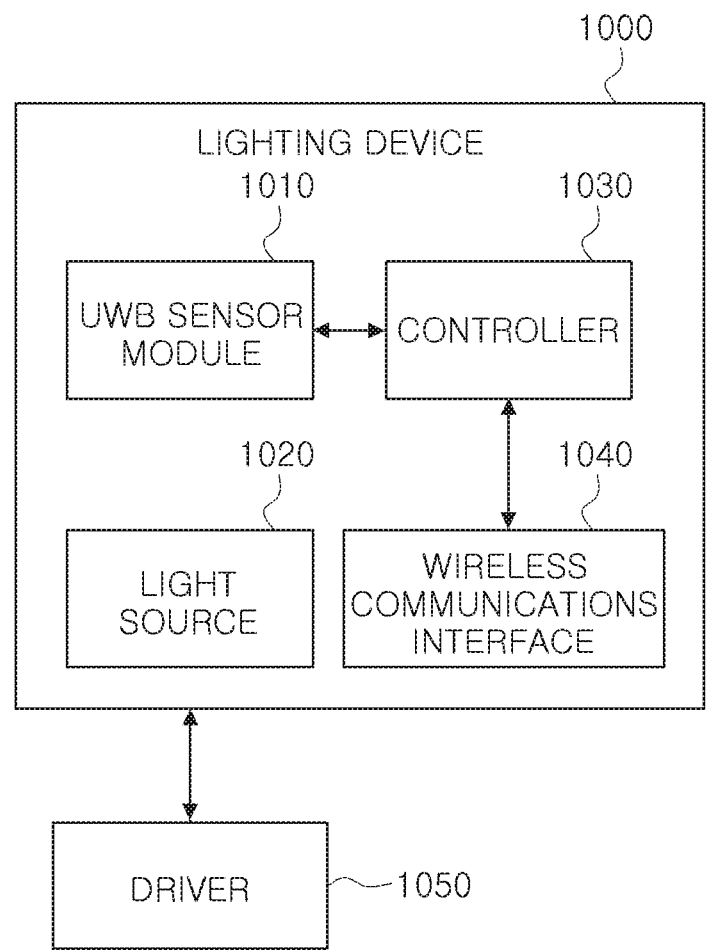

FIG. 11 is a block diagram illustrating a lighting device including an UWB sensor, according to some example embodiments. A lighting device 1000, according to some example embodiments, may include an UWB sensor module 1010, a light source 1020, a controller 1030, and a wireless communications module 1040, and may be integrally provided. According to some example embodiments, the UWB sensor module 1010, the light source 1020, the controller 1030 and the driver 1050 of FIG. 11 are similar to or the same as the UWB sensor module 910, the light source 920, the controller 930 and the driver 940 of FIG. 10. Redundant descriptions between FIGS. 10 and 11 may be omitted below. The lighting device 1000 may be externally connected to a driver 1050, supply a control signal for controlling the light source 1020 to the driver 1050, and receive a voltage or a current for driving the light source 920 from the driver 1050. The controller 1030 may include a communications interface, the communications interface may include a wired communications interface, and the wireless communications module 1040 may be separately provided.

Figure 12:
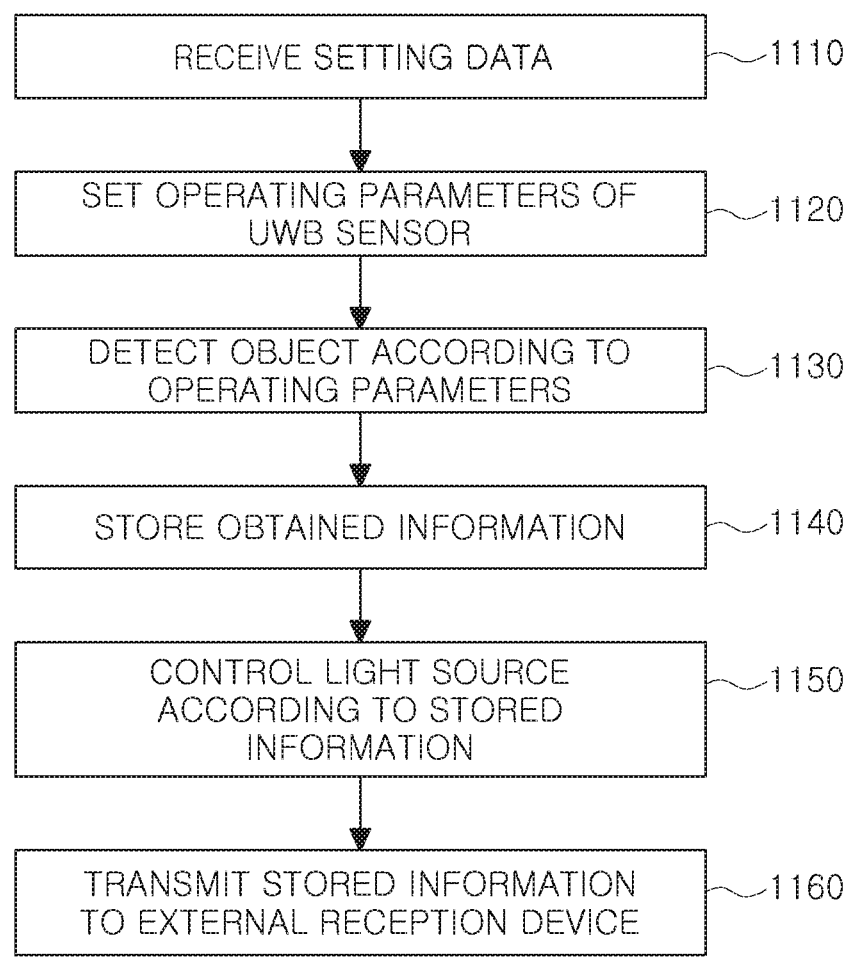
FIG. 12 is a flowchart illustrating a lighting control method, according to some example embodiments.

FIG. 12 is a flowchart illustrating a lighting control method, according to some example embodiments. A lighting control method, according to some example embodiments, may include receiving data for setting operating parameters of an UWB sensor module from an external control device (1110). The external control device 440 may be a separate remote controller provided together with a lighting device, or may be various smart devices such as smartphones, PDAs, tablet PCs, and laptop PCs. The external control device may communicate with the lighting device through various types of communications interfaces. For example, the external control device may communicate with the lighting device through a wireless communications interface, and may also communicate with the lighting device through a wired communications interface. The external control device may transmit the input setting data to the lighting device through the communications interface.

The lighting device may receive the data for setting the operating parameters of the UWB sensor module from the external control device, store the data, and set the operating parameters of the UWB sensor module, based on the data (1120). For example, the received data may be data on a sensitivity with which the UWB sensor module may detect an object, and based on the data, the lighting device may set the sensitivity of the UWB sensor module. For example, the received data may be data on a distance or area in which the UWB sensor module may detect an object, and based on the data, the lighting device may set the detectable distance or area of the UWB sensor module.

When operations of the UWB sensor module are set, the UWB sensor module may detect an object, based on the set operating parameters, to generate data on the presence or absence of the object, movements of the object, and a distance to the object (1130). The data generated by the UWB sensor module may be stored in the lighting device (1140). A light source module of the lighting device may be controlled based on the data stored in the lighting device (1150). Further, the stored data may be transmitted to an external reception device through the communications interface of the lighting device, so as to be used for other purposes (1160). For example, a map, showing the density of objects in a determined specific area, may be generated by collecting data generated by the UWB sensor module.

Figure 13:
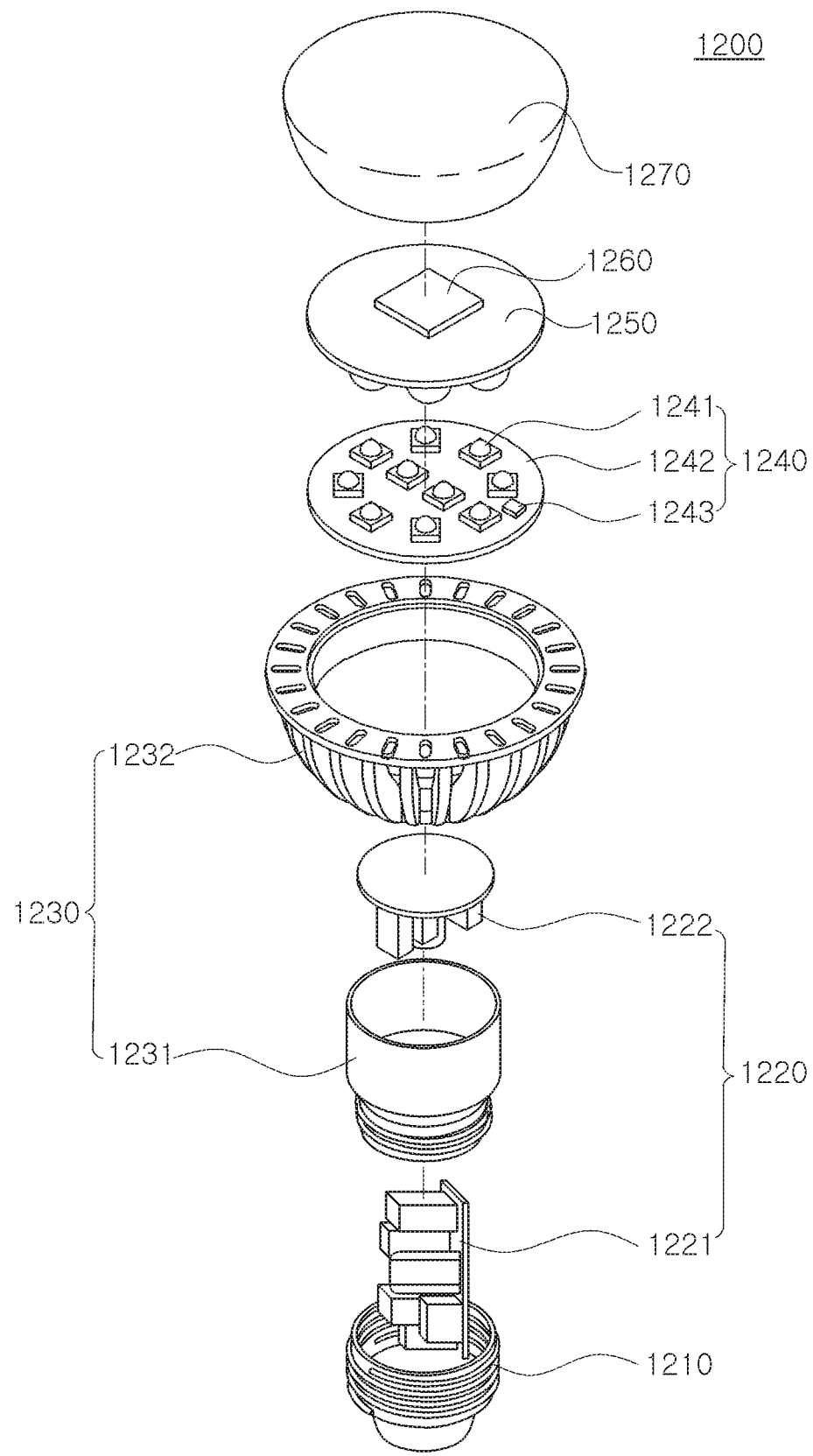
FIG. 13 is an exploded perspective view schematically illustrating a bulb-type lamp as a lighting device, according to some example embodiments.

FIG. 13 is an exploded perspective view schematically illustrating a bulb-type lamp as a lighting device, according to some example embodiments. A lighting device 1200, according to some example embodiments, may include a socket 1210, a driver 1220, a heat sink 1230, a light source 1240, and a reflector or diffuser 1250. According to some example embodiments, the light source 1240 may include a light emitting device array, and the driver 1220 may include a rectifier circuit, a DC-DC converter, a direct-coupled AC driver circuit, or the like. The reflector or diffuser 1250 may be disposed above the light source 1240, and may reduce or prevent glare by evenly diffusing light, emitted from the light source 1240, to a side and rear of the reflector or diffuser 1250. An UWB sensor or an UWB sensor module, according to some example embodiments, may be provided inside the reflector or diffuser 1250 of the lighting device 1200, due to the high transmittivity of a signal from the UWB sensor.

The socket 1210 may replace that of a conventional lighting device. Power supplied to the lighting device 1200 may be applied through the socket 1210. As illustrated in FIG. 13, the driver 1220 may be separated into a first circuit 1221 and a second circuit 1222. The heat sink 1230 may include an internal heat sink 1231 and an external heat sink 1232. The internal heat sink 1231 may be connected, for example, directly connected, to the light source 1240 and/or the driver circuit 1220 to thus transfer heat to the external heat sink 1232.

The light source 1240 may receive power from the driver 1220 to emit light to the reflector or diffuser 1250. The light source 1240 may include at least one light emitting device 1241, a circuit board 1242, and a controller 1243. The controller 1243 may store driving information of the at least one light emitting device 1241.

The controller 1243 may control operations of the driver 1220. A communications module 1260 may be mounted on an upper portion of the reflector or diffuser 1250, and may perform home network communications. For example, the communications module 1260 may be a wireless communications module using Zigbee®, Wi-Fi, or light fidelity (Li-Fi), and may control on and off functions, brightness, a lighting or flashing time, or the like, of a light provided in and around a home through an external control device, such as a smartphone or a wireless controller. In addition, a Li-Fi communications module, using a visible light wavelength of a lighting device provided in and around residential, commercial or industrial spaces, may be used to control electronics, such as a television, a refrigerator, an air-conditioner, a door lock, or may control a vehicle. In particular, operating parameters of the UWB sensor module may be determined through the external control device. For example, sensitivity with which the UWB sensor module may detect an object may be set through the external control device, and a distance or area in which the UWB sensor module may detect an object may be set therethrough.

The reflector or diffuser 1250 and the communications module 1260 may be covered by a cover 1270. The communications module 1260 may also be implemented as a single IC, with the controller 1243. Further, the controller 1243 may be provided as a module distinct from the light source 1240. According to some example embodiments, the driver 1220, the light source 1240 and the controller 1243 of FIG. 13 may be similar to or the same as the driver 421, the light source 422 and the controller 430 of FIG. 5. Redundant descriptions between FIGS. 5 and 13 may be omitted herein.

Figure 14:
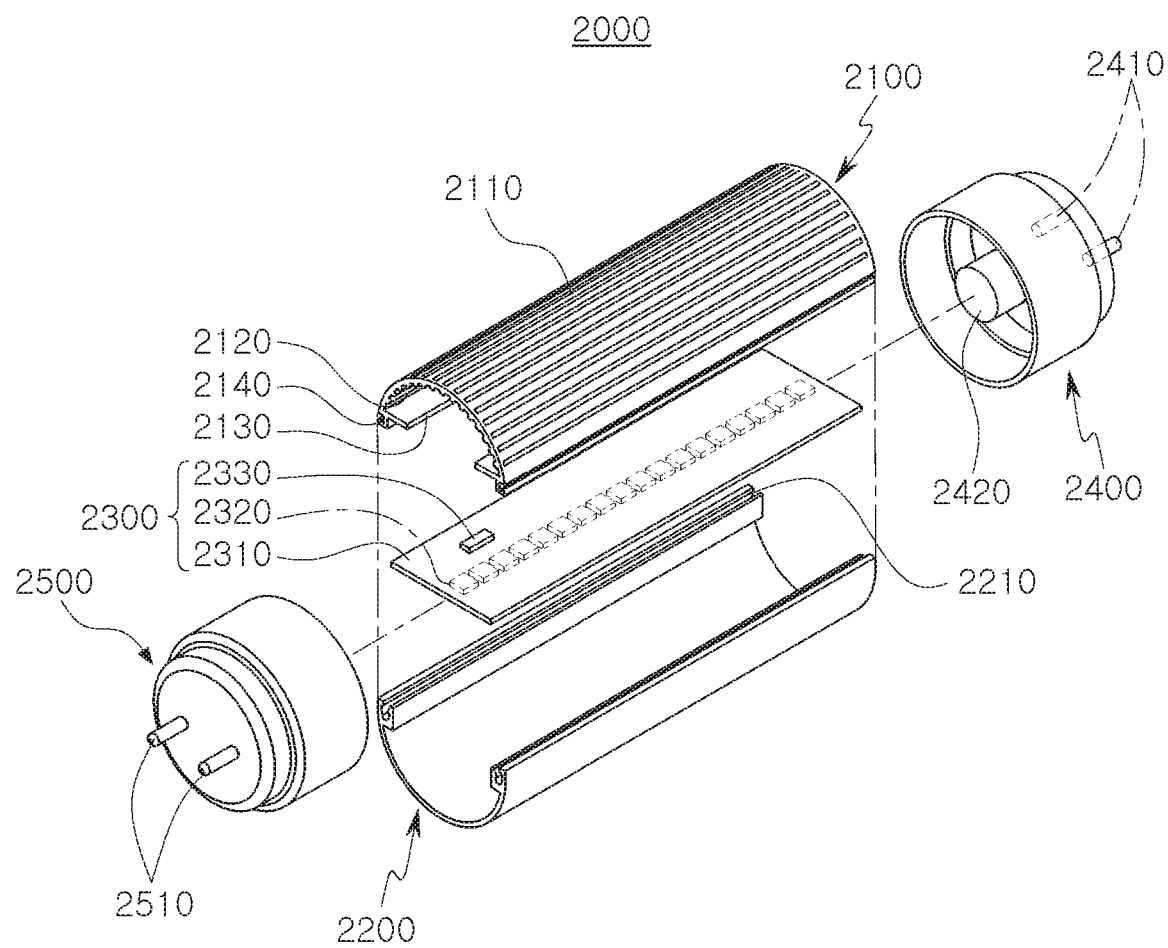
FIG. 14 is an exploded perspective view schematically illustrating a bar-type lamp as a lighting device, according to some example embodiments.

FIG. 14 is an exploded perspective view schematically illustrating a bar-type lamp as a lighting device, according to some example embodiments. A lighting device 2000, according to some example embodiments, may include a heat sink 2100, a cover 2200, a light source module 2300, a first socket 2400, and a second socket 2500. A plurality of heat sink fins 2110 and 2120 may have an uneven shape on internal or/and external surfaces of the heat sink 2100, and may be designed to have various shapes and intervals. The heat sink 2100 may have a protruding form of supports 2130 formed on an inside thereof. The light source module 2300 may be fixed to the supports 2130. Protrusions 2140 may be formed on both sides of the heat sink 2100.

The cover 2200 may have grooves 2210 formed therein, and the protrusions 2140 of the heat sink 2100 may be coupled to the grooves 2210 by a hook coupling structure. Locations of the grooves 2210 and the protrusions 2140 may be reversed with each other.

The light source module 2300 may include a light emitting device array. The light source module 2300 may include a printed circuit board (PCB) 2310, a light source 2320, and a controller 2330. As described above, the controller 2330 may store driving information of the light source 2320. Circuit wirings for operating the light source 2320 may be formed in the PCB 2310. In addition, components for operating the light source 2320 may be included in the PCB 2310.

The first and second sockets 2400 and 2500, as a pair of sockets, may have a structure in which the first and second sockets 2400 and 2500 may be coupled to both ends of a cylindrical cover unit including the heat sink 2100 and the cover 2200. For example, the first socket 2400 may include an electrode terminal 2410 and a power device 2420, and the second socket 2500 may have a dummy terminal 2510 disposed thereon. In addition, an optical sensor and/or a communications module may be built in either of the first socket 2400 or the second socket 2500. For example, an optical sensor and/or a communications module may be built in the second socket 2500 having the dummy terminal 2510 disposed thereon. As another example, an optical sensor and/or a communications module may also be built in the first socket 2400 having the electrode terminal 2410 disposed thereon. According to some example embodiments, the light source module 2300, the light source 2320, and the controller 2330 of FIG. 14 may be similar to or the same as the light source module 120, the light source 122, and the controller 130 of FIG. 2. Redundant descriptions between FIGS. 2 and 14 may be omitted herein.

Figure 15:
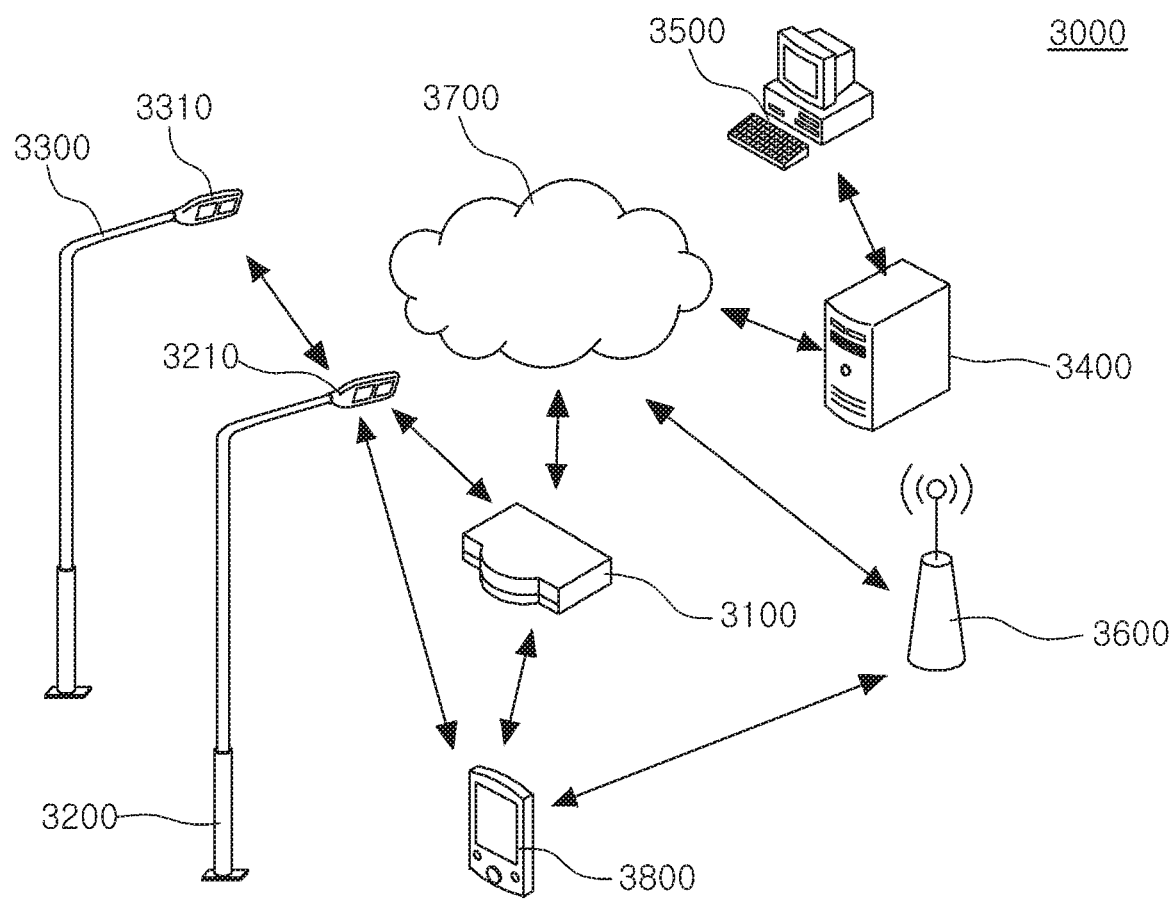
FIG. 15 is a schematic view illustrating a lighting system used in an open space, according to some example embodiments.

FIG. 15 is a schematic view illustrating a lighting system, according to some example embodiments, and is an example in which the lighting system is used in an open space. A lighting system 3000, according to some example embodiments, may include a communications connection device 3100, a plurality of lighting fixtures 3200 and 3300 provided at determined intervals and connected to the communications connection device 3100 to communicate therewith, a server 3400, a computer 3500 managing the server 3400, a communications base station 3600, a communications network 3700 connecting the above-mentioned communicable devices, a mobile device 3800, or the like.

The lighting fixtures 3200 and 3300 provided in an external open space, such as a street or park, may include smart engines 3210 and 3310, respectively. In addition to a light emitting device emitting light and a driver driving the light emitting device, each of the smart engines 3210 and 3310 may include a sensor collecting information regarding surroundings, a communications module, and a controller controlling the driver and the sensor. The sensor, collecting the information regarding the surroundings, may include an UWB sensor to detect whether a peripheral object is present, a degree of movements of the peripheral object, or the like. The smart engines 3210 and 3310 may adjust or set operations of the UWB sensor. The smart engines 3210 and 3310 may communicate with other neighboring devices using a communications protocol, such as Wi-Fi, Zigbee®, or Li-Fi.

As an example, one smart engine 3210 may be connected to another smart engine 3310 to communicate therewith. In this case, a Wi-Fi extension technology (Wi-Fi mesh) may be applied to communications between the smart engines 3210 and 3310. At least one smart engine 3210 may be connected to the communications connection device 3100 linked to the communications network 3700 through wired/wireless communications. To increase communications efficiency, several smart engines 3210 and 3310 may be grouped into one to be connected to a single communications connection device 3100.

The communications connection device 3100, as an access point (AP) available for wired/wireless communications, may relay communications between the communications network 3700 and other devices. The communications connection device 3100 may be connected to the communications network 3700 by at least one of wired and wireless schemes. As an example, the communications connection device 3100 may be mechanically accommodated in one of the lighting fixtures 3200 and 3300.

The communications connection device 3100 may be connected to the mobile device 3800 using a communications protocol, such as Wi-Fi, or the like. The user of the mobile device 3800 may receive information regarding surroundings collected by the smart engines 3210 and 3310 through the communications connection device 3100 connected to the smart engine 3210 of the lighting fixture 3200 adjacent to the mobile device 3800. The surrounding environmental information may include surrounding traffic information and weather information, and may also include whether a peripheral object detected by the UWB sensor is present and information on movements of the peripheral object. The mobile device 3800 may also be connected to the communications network 3700 by a wireless cellular communications scheme, such as 3G or 4G, through the communications base station 3600.

Meanwhile, the server 3400 connected to the communications network 3700 may monitor operating states, or the like, of the respective lighting fixtures 3200 and 3300, while receiving information collected by the smart engines 3210 and 3310 respectively mounted in the lighting fixtures 3200 and 3300. To manage the respective lighting fixtures 3200 and 3300 on the basis of the monitoring results of the operating states of the lighting fixtures 3200 and 3300, the server 3400 may be connected to the computer 3500 providing a management system. The computer 3500 may execute software, or the like, that may monitor and manage operating states of the respective lighting fixtures 3200 and 3300, particularly, the smart engines 3210 and 3310.

Figure 16:
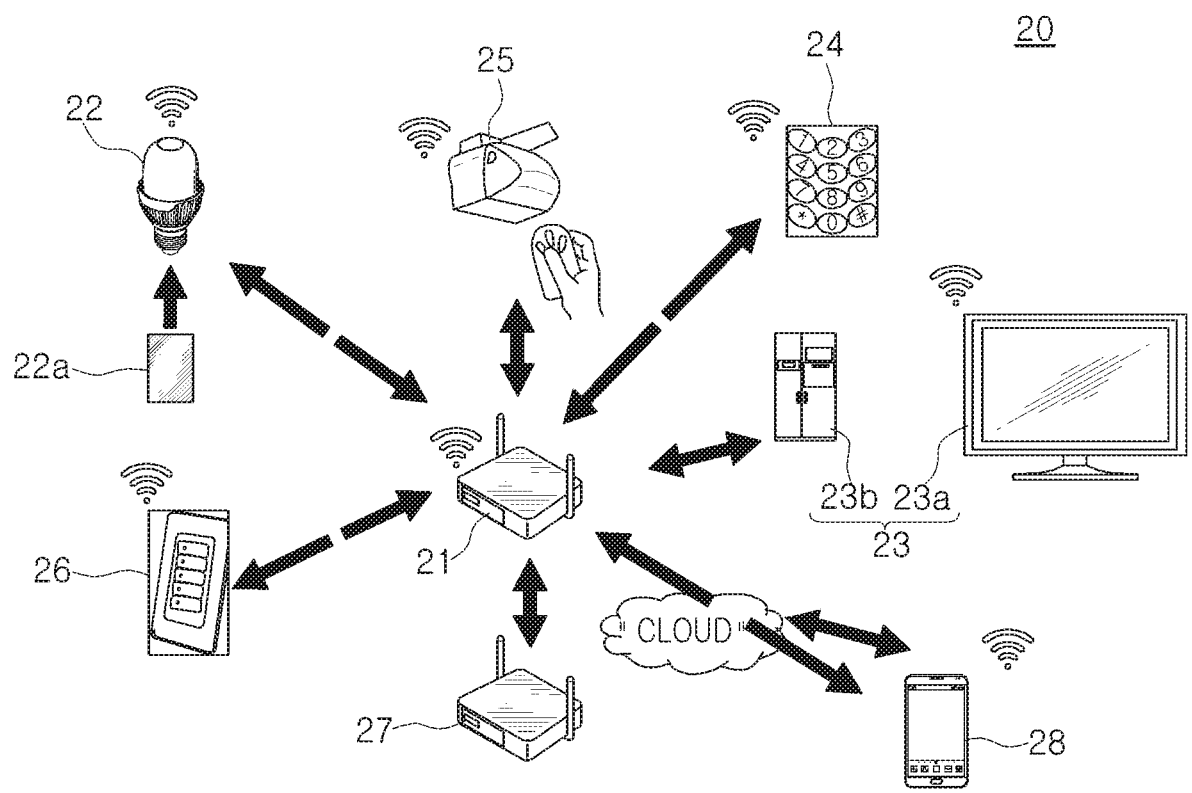
FIG. 16 is a diagram illustrating wireless communications between a control device and a lighting device in a lighting system, according to some example embodiments.

FIG. 16 is a diagram illustrating wireless communications between a control device and a lighting device in a lighting system, according to some example embodiments. A lighting system 20, according to some example embodiments, may be employed in an interior space. The lighting system 20 may be a complex smart lighting-network system in which lighting technology, Internet of Things (IoT) technology, wireless communications technology, and the like, using a light emitting device, such as an LED, converge. The lighting system 20 may be implemented using various types of lighting devices and wired and wireless communications devices, and may be realized by a sensor, a controller, a communications unit, software for network control and maintenance, and the like.

The lighting system 20 may be used in an open space, such as a park or street, as well as in a closed space defined within a building, such as a home or office. The lighting system 20 may be implemented on the basis of an IoT environment to collect or process various pieces of information and provide the collected or processed information to the user. An LED lamp 22 included in the lighting system 20 may function to check and control operating states of other devices 23 to 28 included in the IoT environment on the basis of a function of the LED lamp 22, such as visible light communications, as well as to receive information regarding surroundings from a gateway 21 to control the illumination of the LED lamp 22 itself.

The LED lamp 22 may include a plurality of sensors. The sensors may collect information on humidity, temperature, and/or luminance for monitoring an internal state of the LED lamp 22, as well as collect information regarding surroundings of the LED lamp 22. A control device mounted in the LED lamp 22 may collect operational information of the LED lamp 22 along with information on internal humidity, temperature, and/or luminance of the LED lamp 22, may periodically store the collected operational information, and when an abnormal operation or the like of the LED lamp 22 is detected, may quickly report abnormalities of the LED lamp 22 to a mobile device 28 of the user through the gateway 21. Further, the LED lamp 22 may include an UWB sensor to detect a peripheral object. The LED lamp 22 may collect information regarding whether a peripheral object is present and movements of the peripheral object, may periodically store the collected information, and may transmit the stored information to the mobile device 28 of the user through the gateway 21. The mobile device 28 may communicate with the LED lamp 22 through the gateway 21, or may also communicate with the LED lamp 22 without the gateway 21. According to some example embodiments, the mobile device 28 may communicate with the LED lamp through a cloud network.

In particular, the mobile device 28 may be provided as a control device controlling operations of the LED lamp 22, and may set or adjust operating parameters of the UWB sensor included in the LED lamp 22. To directly communicate with the mobile device 28, the LED lamp 22 may include various types of wired or wireless communications modules.

The lighting system 20 may include the gateway 21 processing data transmitted and received according to different communications protocols, the LED lamp 22 connected to the gateway 21 to communicate therewith and including an LED, a plurality of sensors, and the like, and the devices 23 to 28 connected to the gateway 21 to communicate therewith according to various wireless communications schemes. The lighting system 20 may be implemented on the basis of the IoT environment, and the respective devices 23 to 28 including the LED lamp 22 may include at least one communications module. As an example, the LED lamp 22 may be connected to the gateway 21 to communicate therewith by wireless communications protocols, such as Wi-Fi, Zigbee®, Li-Fi, and Bluetooth®, and may have at least one communication module 22*a* (also referred to as the communications module for the lamp herein) for the LED lamp 22.

As described above, the lighting system 20 may be used in an open space, such as a park or street, as well as in a closed space, such as a home or office. When the lighting system 20 is used in a home, the devices 23 to 28 included in the lighting system 20 and connected to the gateway 21 to communicate therewith on the basis of IoT technology may include home appliances 23, a digital door lock 24, a garage door lock 25, a lighting switch 26 provided in a home, a router 27 for wireless network relay, and the mobile device 28, such as a smartphone, a tablet PC, or a laptop PC. According to some example embodiments, the home appliances 23 may include a television 23*a* and a refrigerator 23*b*.

In the lighting system 20, the LED lamp 22 may check operating states of the various devices 23 to 28, or may automatically adjust luminance of the LED lamp 22 itself, according to surroundings or circumstances of the devices, using a wireless communications network (Zigbee®, Wi-Fi, Li-Fi, or the like) provided in a home. Further, the devices 23 to 28 included in the lighting system 20 may also be controlled using Li-Fi communications using visible light emitted from the LED lamp 22.

First, the LED lamp 22 may automatically control luminance of the LED lamp 22 on the basis of information regarding surroundings transmitted from the gateway 21 through the communications module for the lamp 22a, or information regarding surroundings collected by the sensor mounted in the LED lamp 22. For example, the brightness of the LED lamp 22 may be automatically adjusted, according to a type of a program being broadcast on the television 23a or brightness of an image. To this end, the LED lamp 22 may receive operational information of the television 23a from the communications module for the lamp 22a connected to the gateway 21. The communications module for the lamp 22a may be integrally modularized with a sensor and/or a controller included in the LED lamp 22.

For example, when a program broadcast on the television 23a is a drama, a color temperature of illumination may be adjusted to be less than or equal to 12,000 K, for example, 5,000 K, according to determined settings to control colors, thus creating a cozy atmosphere. In a different manner, when a program is a comedy, the lighting system 20 may be configured in such a manner that a color temperature of illumination may be increased to 5,000 K or more, and adjusted to be white, based on blue light, according to determined settings.

In addition, after the digital door lock 24 is locked without a person in a home, when a certain period of time has elapsed, all turned-on LED lamps 22 may be turned off to prevent or reduce electricity consumption. Alternatively, in a case in which a security mode is set by the mobile device 28, or the like, when the digital door lock 24 is locked without a person in a home, the LED lamp 22 may remain turned on.

Operations of the LED lamp 22 may also be controlled according to information regarding surroundings collected by various types of sensors connected to the lighting system 20. For example, when the lighting system 20 is provided in a building, a light, a position sensor, and a communications module may be combined with each other in the building to collect information on locations of people within the building, so that the light may be turned on or off or the collected information may be provided to the user in real time, thus enabling more efficient facility management or use of idle space. In general, since a lighting device, such as the LED lamp 22, may be disposed in almost all of the spaces on each floor of a building, various pieces of information within the building may be collected by a sensor integrally provided with the LED lamp 22, and the collected information may be used for management of facilities, utilization of idle space, or the like.

Meanwhile, a combination of the LED lamp 22 with an UWB sensor, a storage device, the communications module for the lamp 22a, and the like may allow the LED lamp 22 to be utilized as a device that may maintain building security or detect and deal with an emergency. For example, when a smoke or temperature sensor is attached to the LED lamp 22, the LED lamp 22 may quickly detect whether a fire or the like occurs, thereby reducing or preventing property damage or personal injury therefrom. In addition, brightness of lighting may be adjusted in consideration of external weather or an amount of sunshine, thus saving energy and providing a comfortable lighting environment.

As described above, the lighting system 20 may be used in an open space, such as a park or street, as well as in a closed space, such as a home or office. When the lighting system 20 is used in an open space without physical limitations, the implementation of the lighting system 20 may be relatively difficult, depending on restrictions on wireless communication coverage, communications interference caused by various obstacles, and the like. Thus, when the lighting system 20 is used in the open space, a sensor, a communications module, and the like may be mounted in respective lighting fixtures, and the lighting fixtures may be used for information collecting and communications relaying.

As set forth above, according to some example embodiments, lighting systems, lighting devices and lighting control methods may detect an object using an ultra-wideband (UWB) sensor, thus controlling a light. In particular, the UWB sensor may adjust sensitivity with which an object may be detected, and a distance or area in which an object may be detected. Further, the UWB sensor may adjust sensitivity with which an object may be detected, and a distance or area in which an object may be detected through an external control device. Further, the lighting systems, the lighting devices and the lighting control methods may control a light using data regarding whether an object is detected and on a detection distance, and may transmit such data to an external reception device. Thus, the data may be used for other purposes.

While some example embodiments have been shown and described above, it will be apparent to those skilled in the art that modifications and variations could be made without departing from the scope of the appended claims.

What is claimed is:

1. A lighting device comprising:
an ultra-wideband (UWB) sensor module configured to detect movement;
a light source module having
a plurality of light emitting diodes (LEDs), and
a driver configured to drive the plurality of LEDs; and
a first controller connected to the light source module and the UWB sensor module, the first controller being configured to
receive setting data from an external control device,
output the setting data to the UWB sensor module to cause the UWB sensor module to set at least one operational parameter of the UWB sensor module, and
output a control signal to the driver to cause the driver to drive the plurality of LEDs,
wherein the UWB sensor module comprises:
an UWB sensor configured to generate a pulse signal, transmit the generated pulse signal, and receive a signal reflected from an object; and
a second controller configured to control operations of the UWB sensor, and process the signal.

2. The lighting device of claim 1, wherein the setting data comprises data indicating a sensitivity with which the UWB sensor module detects the movement.

3. The lighting device of claim 1, wherein the setting data comprises data indicating a distance at which the UWB sensor module detects the movement.

4. The lighting device of claim 1, wherein the second controller is further configured to process the signal based on the setting data.

5. The lighting device of claim 1, wherein the first controller comprises:
a memory configured to store information obtained by the UWB sensor module;
at least one processor configured to
store information in the memory, and
manage the stored information; and
a communications interface connected to the UWB sensor module and the light source module.

6. The lighting device of claim 5, wherein the communications interface comprises at least one of a Digital Addressable Lighting Interface (DALI), a Universal Asynchronous Receiver-Transmitter (UART), a General-Purpose Input/Output (GPIO) or a 0-10 V lighting control interface.

7. The lighting device of claim 5, wherein the communications interface comprises a wireless communications interface.

8. The lighting device of claim 7, wherein the wireless communications interface comprises at least one of a Bluetooth® communications interface, a Bluetooth® Low Energy communications interface, a Wi-Fi communications interface, or a Zigbee® communications interface.

9. The lighting device of claim 5, wherein the first controller is further configured to send information stored in the memory to an external reception device.

10. The lighting device of claim 9, wherein the external reception device comprises at least one of a mobile application, a bridge, a gateway, or an access point.

11. The lighting device of claim 1, wherein the external control device is at least one of a smartphone, a table personal computer (PC), a mobile phone, or a laptop PC.

12. The lighting device of claim 1, wherein the UWB sensor module and the first controller are provided within a common housing.

13. The lighting device of claim 1, wherein the UWB sensor module, the first controller, and the driver are provided within a common housing.

14. The lighting device of claim 1, wherein the UWB sensor module, the first controller, and the plurality of LEDs are provided within a common housing.

15. The lighting device of claim 1, wherein the UWB sensor module is further configured to output data indicating a distance at which an object is detected.

16. A lighting system comprising:
a lighting device configured to
   detect movement using an UWB sensor, the detection being based on setting data, and
   drive a plurality of LEDs based on the detected movement; and
a control device connected to the lighting device, the control device being configured to provide the setting data to the lighting device,
wherein the lighting device comprises:
   an UWB sensor module having the UWB sensor;
   a light source module having the plurality of LEDs;
   a driver driving the plurality of LEDs; and
   a first controller connected to the light source module and the UWB sensor module, the first controller being configured to
      receive the setting data from the control device,
      output the setting data to the UWB sensor module to set operations of the UWB sensor module, and
      output a control signal to the driver to cause the driver to drive the plurality of LEDs,
wherein
   the UWB sensor is configured to generate a pulse signal, transmit the generated pulse signal, and receive a signal reflected from an object; and
   the UWB sensor module comprises: a second controller configured to control operations of the UWB sensor, and process the signal.

* * * * *